US010573068B2

(12) United States Patent
Liu et al.

(10) Patent No.: US 10,573,068 B2
(45) Date of Patent: Feb. 25, 2020

(54) METHOD, DEVICE, TERMINAL AND SYSTEM FOR VISUALIZATION OF VEHICLE'S BLIND SPOT AND A VEHICLE

(71) Applicant: BOE TECHNOLOGY GROUP CO., LTD., Beijing (CN)

(72) Inventors: Tong Liu, Beijing (CN); Yue Li, Beijing (CN); Haijun Su, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 10 days.

(21) Appl. No.: 15/986,947

(22) Filed: May 23, 2018

(65) Prior Publication Data
US 2019/0088011 A1    Mar. 21, 2019

(30) Foreign Application Priority Data

Sep. 20, 2017    (CN) .......................... 2017 1 0854609

(51) Int. Cl.
*G06T 17/05*      (2011.01)
*G06T 19/00*      (2011.01)
(Continued)

(52) U.S. Cl.
CPC ............... *G06T 17/05* (2013.01); *B60R 1/00* (2013.01); *G06T 15/20* (2013.01); *G06T 19/003* (2013.01);
(Continued)

(58) Field of Classification Search
CPC .......... G08G 1/16; G08G 1/167; G08G 1/168; G08G 1/0969; B60W 30/095;
(Continued)

(56) References Cited

U.S. PATENT DOCUMENTS

| 9,858,817 B1* | 1/2018 | Bletzer ................... B60R 1/00 |
| 2006/0142981 A1* | 6/2006 | Greiffenhagen ........................... G08B 13/19604 703/2 |

(Continued)

FOREIGN PATENT DOCUMENTS

| CN | 102874175 A | 1/2013 |
| CN | 104890574 A | 9/2015 |

(Continued)

OTHER PUBLICATIONS

First Office Action for Chinese Patent Application No. 201710854609.9 dated Mar. 18, 2019.

*Primary Examiner* — Haixia Du
(74) *Attorney, Agent, or Firm* — Calfee, Halter & Griswold LLP (57) ABSTRACT

The present disclosure provides a method, a device, a terminal, a system and a vehicle for visualization of vehicle's blind spot. The method includes: acquiring real-time image data in front of the vehicle; creating a Three-Dimension (3D) map with the acquired image data; determining a current location of the vehicle in the 3D map; acquiring the relative location information between the driver and the sight-blocking object that blocks the vision of the driver; determining the blind spot in the vision of the driver in connection with structure information of the sight-blocking object and the relative location information between the driver and the sight-blocking object that blocks the vision of the driver; and determining environmental information of the blind spot in the vision in accordance with the 3D map, the current location of the vehicle in the 3D map and the blind spot in the vision of the driver.

19 Claims, 2 Drawing Sheets

(51) Int. Cl.
  *B60R 1/00* (2006.01)
  *G08G 1/16* (2006.01)
  *G06T 15/20* (2011.01)
  *G06K 9/00* (2006.01)

(52) U.S. Cl.
  CPC ............. *G08G 1/166* (2013.01); *G08G 1/167* (2013.01); *B60R 2300/30* (2013.01); *B60R 2300/303* (2013.01); *B60R 2300/307* (2013.01); *B60R 2300/607* (2013.01); *B60R 2300/802* (2013.01); *G06K 9/00805* (2013.01); *G06K 9/00832* (2013.01); *G06T 2200/08* (2013.01)

(58) Field of Classification Search
  CPC ........ B60W 2050/146; B60W 2420/42; B60R 2001/1253; B60R 2300/802; G06K 9/00791; G09G 2380/10; H04N 21/41422; B60T 2210/34; G06T 2207/30252
  See application file for complete search history.

(56) References Cited

U.S. PATENT DOCUMENTS

| | | | |
|---|---|---|---|
| 2010/0099353 A1* | 4/2010 | Komori | G08G 1/096716 455/39 |
| 2014/0100770 A1* | 4/2014 | Chiang | B60Q 9/008 701/301 |
| 2016/0358477 A1* | 12/2016 | Ansari | G08G 1/167 |
| 2018/0051990 A1* | 2/2018 | Takeuchi | G01C 21/165 |

FOREIGN PATENT DOCUMENTS

| | | |
|---|---|---|
| CN | 106608221 A | 5/2017 |
| CN | 107128245 A | 9/2017 |

\* cited by examiner

METHOD, DEVICE, TERMINAL AND SYSTEM FOR VISUALIZATION OF VEHICLE'S BLIND SPOT AND A VEHICLE

CROSS REFERENCE

The present application claims the priority of Chinese Patent Application No. 201710854609.9, filed on Sep. 20, 2017, and the entire contents thereof are incorporated herein by reference as part of the present application.

TECHNICAL FIELD

The present disclosure relates to fields of image display and vehicle security technology, more particularly, to a method, a device, a terminal, a system and a vehicle for visualization of vehicle's blind spot.

BACKGROUND

It is well known that there are three kinds of pillar on each side of a vehicle body called "A pillars", "B pillars" and "C pillars". The "A pillars" are inclined pillars on both side of the front windshield, the "B pillars" are pillars between the front and rear doors of the vehicle and the "C pillars" are inclined pillars on both side of the rear windshield. During traveling, a blind spot of a vision may be caused to the driver due to the "A pillars", the "B pillars" and the "C pillars", especially the "A pillars" (for example, the "A pillar" which is on the side closest to the driver may significantly infect the vision of the driver), which always results in inconvenience for driving or a traffic accident. The width of the "A pillar" is about 8 cm and assuming that the driver resides at the left of the vehicle, the angle of the blind spot caused by the left "A pillar" on the left vision for the driver is 6 degrees and the angle of the blind spot caused by the left "A pillar" on the right vision is 2 degrees. While a pedestrian or a vehicle happens to be within the blind spot on the left vision, the driver cannot see the pedestrian or the vehicle within the blind spot on the left vision, which results in occurrence of a traffic accident. Statistics shows that 20% of traffic accidents are related to "A pillars".

SUMMARY

The present disclosure provides a method for visualization of vehicle's blind spot, including the following steps.

Real-time image data in front of the vehicle is acquired.

A Three-Dimension (3D) map is created with the acquired image data.

A current location of the vehicle is determined in the 3D map.

A blind spot is determined in a vision of a driver.

Environmental information of the blind spot in the vision is determined in accordance with the 3D map, the current location of the vehicle in the 3D map and the blind spot in the vision of the driver.

According to an embodiment, after the determining environmental information of the blind spot in the vision in accordance with the 3D map, the current location of the vehicle in the 3D map and the blind spot in the vision of the driver, the method further includes:

detecting environmental information of the blind spot in the vision in real-time, so as to determine whether a target object is presented in the blind spot in the vision; and sending warning information if presented.

According to an embodiment, after the determining environmental information of the blind spot in the vision in accordance with the 3D map, the current location of the vehicle in the 3D map and the blind spot in the vision of the driver, the method further includes:

displaying the environmental information of the blind spot in the vision inside the compartment of the vehicle.

According to an embodiment, the determining a blind spot in a vision of a driver includes:

acquiring real-time image data of an inside of the compartment of the vehicle to create a compartment 3D model regarding the inside of the compartment of the vehicle;

creating a coordinate system;

determining coordinate values of the driver and the target object in the coordinate system based on the compartment 3D model;

calculating relative location information between the driver and a sight-blocking object;

acquiring the relative location information between the driver and the sight-blocking object that blocks the vision of the driver; and determining the blind spot in the vision of the driver in connection with structure information of the sight-blocking object and the relative location information between the driver and the sight-blocking object that blocks the vision of the driver.

According to an embodiment, before the steps of acquiring real-time image data in front of the vehicle, creating a Three-Dimension (3D) map with the acquired image data and determining a current location of the vehicle in the 3D map, the method further includes:

pre-setting parameter information of the vehicle's body and the structure information of the sight-blocking object.

The structure information of the sight-blocking object includes at least one of lengths of edges of the sight-blocking object, tops and/or ends of the edges of the sight-blocking object, an intersection of the edges of the sight-blocking object and an area of a surface of the sight-blocking object that faces the driver.

According to an embodiment, the determining the blind spot in the vision of the driver in connection with structure information of the sight-blocking object includes:

acquiring coordinate values of the ends and/or the tops of the edges of the sight-blocking object in the coordinate system;

connecting, in the compartment 3D model, a reference point with the tops and/or ends of the edges of the sight-blocking object that blocks the vision of the driver through a straight line, wherein the reference point is a point defined by the coordinate values where the driver is, wherein the reference point is a point defined by the coordinate values where the driver is; and extending the straight line away from the driver from a start point towards an eyesight direction of the driver, wherein the start point is determined by an intersection between the edge of the sight-blocking object and the straight line.

A region which is enclosed by the straight line and the sight-blocking object and is away from the driver is determined as the blind spot in the vision.

According to an embodiment, the determining a current location of the vehicle in the 3D map includes:

creating a body model of the vehicle in the 3D map based on a reference point according to the parameter information of the vehicle's body and determining the current location of the vehicle in the 3D map, wherein the reference point is a position of a device for acquiring real-time image data of the inside of the compartment of the vehicle.

According to an embodiment, the 3D map and/or the compartment 3D model is created by Simultaneous Localization and Mapping (SLAM).

According to an embodiment, the creating the 3D map and/or the compartment 3D model by SLAM includes:

acquiring real-time image data in front of the vehicle/real-time image data of the inside of the compartment of the vehicle;

extracting feature points of the real-time image data in front of the vehicle/the real-time image data of the inside of the compartment of the vehicle;

matching the feature points of the real-time image data in front of the vehicle/the real-time image data of the inside of the compartment of the vehicle in different frames;

estimating a motion parameter of the 3D map based on feature points successfully matched of the real-time image data in front of the vehicle/the real-time image data of the inside of the compartment of the vehicle in different frames and a normalization algorithm of the feature points;

converting the feature points of the real-time image data in front of the vehicle/the real-time image data of the inside of the compartment of the vehicle in all frames to a same coordinate system in accordance with the motion parameter; and creating the 3D map and/or the compartment 3D model.

According to an embodiment, the sight-blocking object is an A pillar of the vehicle.

According to an embodiment, the warning information is a voice prompt or a text prompt, or the warning information is carried out in the form of which the target object in the blind spot in the vision is flickered or highlighted inside the compartment of the vehicle.

A device for visualization of vehicle's blind spot includes a creating module for creating a map, a determining module for determining a blind spot and an acquiring module for acquiring a target object in a blind spot.

The creating module is configured to acquire real-time image data in front of the vehicle, create a Three-Dimension (3D) map with the acquired image data and determine a current location of the vehicle in the 3D map.

The determining module is configured to a blind spot in a vision of a driver.

The acquiring module is configured to determine environmental information of the blind spot in the vision in accordance with the 3D map, the current location of the vehicle in the 3D map and the blind spot in the vision of the driver.

A terminal for visualization of vehicle's blind spot includes a processor and a memory.

The memory is configured to store computer program which realizes any one of the methods described above when executed by the processor.

A system for visualization of vehicle's blind spot includes the terminal described above and an image device which is configured to capture real-time image data and send the real-time data to the terminal.

A vehicle includes the system described above.

The additional aspects and advantages in the present disclosure, which are obvious from the following description or known by practicing the present disclosure, will be given in the following description.

BRIEF DESCRIPTION OF THE DRAWINGS

The above mentioned and/or additional aspects and advantages in the present disclosure will be obvious and readily understood from the description of embodiments in connection with the drawings, where.

DETAILED DESCRIPTION

Embodiments of the present disclosure will be described in detail and examples of the embodiments will be shown in drawings, in which the same or similar reference numbers are referred to the same or similar elements or the elements having the same or similar function throughout specification. The following embodiments described in connection with the drawings are exemplary and merely used to interpret the present disclosure. These embodiments are not intended to be interpreted as limitations to the present disclosure.

It is appreciated for those skilled in the art that the singular terms used herein, such as "a", "an", "the" or "said" may also refer to plurality unless stated otherwise. It is further appreciated that the term "include" indicates the presence of the feature, the integer, the step, the operation, the element and/or component, but does not exclude the presence or addition of one or more other features, the integers, the steps, the operations, the elements, components and/or combinations thereof. It is noted that when we refer to that an element is "connected" or "coupled" to another element, it means that the element may directly connected or coupled to the another element, or that there is an intermediate element there-between. In addition, "connection" or "coupling" used herein may include wire connection or wireless coupling. The term "and/or" or "/" used herein indicates that all or any one of the one or more associated terms listed, or all combinations thereof.

It is appreciated for those skilled in the art that all terms (including technical terms and scientific terms) used herein have general meaning in the same as understanding for an ordinary one in the art to which the technical field of the present disclosure pertains, unless defined otherwise. It is also appreciated that those terms defined by generic dictionaries shall be understood as having the meanings in the same as that in the context of the prior art, and do not to be interpreted with the idealized or the excessively official meanings unless defined otherwise.

A blind spot of a vehicle refers to the region that is sight-blocking objected by the vehicle's body and cannot be seen directly by a driver when the driver is in position. Since the driver in the vehicle may only observe a part of the outside of the vehicle via windows and further some obstacles outside the vehicle may also infect the driver to observe the road, traffic accidents may occur. However, enhancement of security measures during driving and compliance with traffic regulations and morality for driving can merely avoid some traffic accidents. Only when any potential consequence can be predicted in advance in any case, occurrence of traffic accident can be truly improved. During traveling, the three kinds of pillar on the vehicle's body may cause a relative large blinding area in the vision for the driver. However, the existing technology, which is used to confirm whether a target object that may cause a traffic accident is existed in the blinding area so as to ensure the security during driving, is carried out with a high cost, many of apparatuses and complexity for installation, and may also infect aesthetics of the vehicle's body and capacity of the compartment. Without infecting aesthetics of the vehicle and capacity of the compartment, acquisition of the environmental information of the blind spot in the vision of the driver can be realized by the technical solutions in the present disclosure in connection with the existing image devices of the vehicle while mounting less apparatuses.

Figure 1:
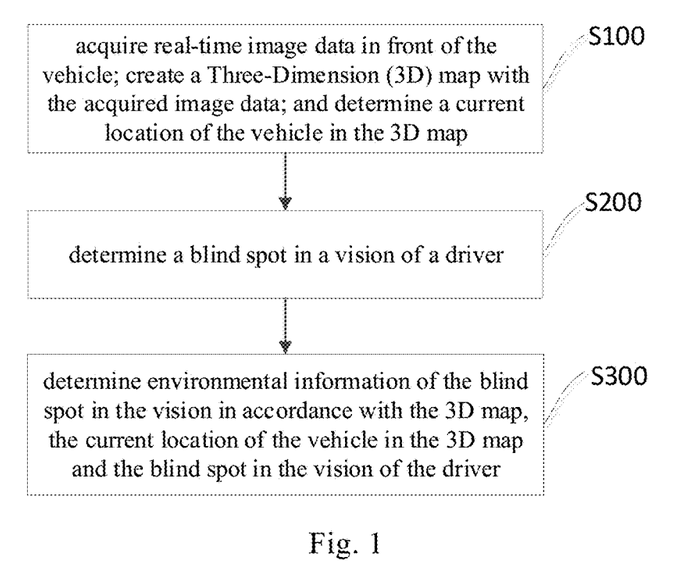
FIG. 1 is a flowchart illustrating a method for visualization of vehicle's blind spot of an embodiment in the present disclosure.

The present disclosure provides a method for visualization of vehicle's blind spot, as shown in FIG. 1, including steps S100-S300.

In S100, real-time image data in front of the vehicle is acquired, a Three-Dimension (3D) map is created with the acquired image data and a current location of the vehicle is determined in the 3D map.

Figure 2:
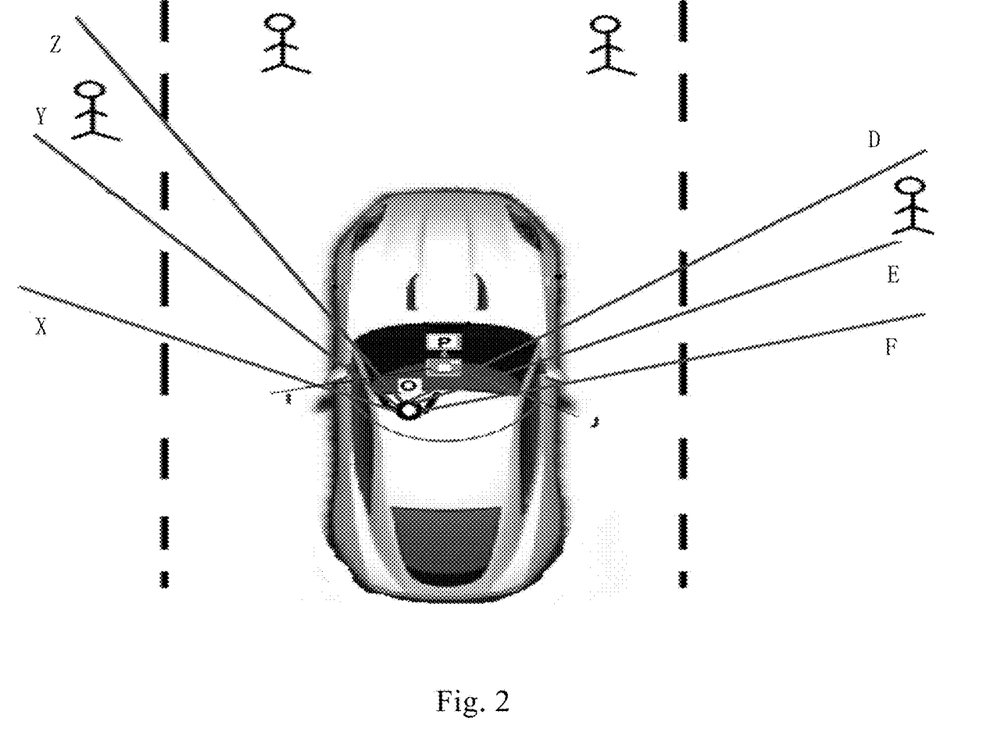
FIG. 2 is a schematic diagram illustrating a blind spot in a vision of a driver in the method for visualization of vehicle's blind spot according to the present disclosure.
Figure 3:
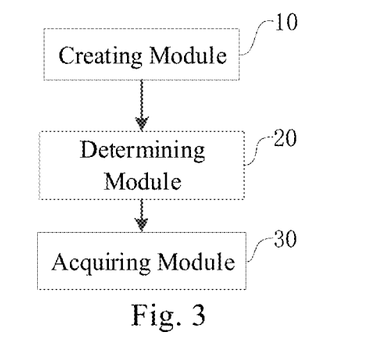
FIG. 3 is a schematic diagram illustrating a structure of a device for visualization of vehicle's blind spot according to an embodiment of the present disclosure.

During traveling, the driver can merely observe the external environment via windows and the environment in the region sight-blocking objected by the non-transparent component of the vehicle cannot be observed by the driver, thus a blind spot within a certain angle may be caused. If there is a target object within the blind spot, it may cause a traffic accident. The detailed description in the embodiments of the present disclosure will be given to the blind spot caused by an A pillar from the body structure. There are provided with image devices in the conventional compartment, and one of which is mainly used to capture the real-time image data in front of the vehicle along the traveling direction. The real-time image data includes environmental information in front of the vehicle and target objects in surroundings such as buildings, plants, pedestrians, other obstacles and the like. Specifically, as shown in FIG. 2, the angle range XOF is a maximum range of external environment that can be observed by the driver. The image device P in front of the vehicle may capture the real-time image in front of the vehicle and may configure the real-time image data to create a Three-Dimension (3D) map so as to acquire the 3D map including the outside environmental information within the angle range YOE. Then, a 3D map may be created with the acquired image data through the Simultaneous Localization and Mapping (SLAM) visual technology. Further, the current location of the vehicle can be determined by the created 3D map and the location of the image device. Since the 3D map is included with the real-time environmental information within the angle range YOE, that is, buildings, plants, pedestrians, other obstacles and the like in the environment, when creating the 3D map, the location information of the vehicle in the 3D map (i.e., the current location of the vehicle in the 3D map) can be determined by acquiring the relative location information between the location of the image device that obtains the real-time image and the environmental information within the angle range YOE (e.g., buildings, plants, pedestrians, other obstacles and the like), thereby reducing the time cost. The image device may include various cameras, such as a monocular camera, a stereo camera, a depth camera, a wide-angle camera or normal angle camera and it can be mounted on the reverse side of the rear-view mirror or on the dashboard of the vehicle. It is preferred that the image device on the reverse side of the rear-view mirror may capture a wide range of the environmental information on both side of the vehicle, and thereby target objects in the environment can be detected effectively.

In S200, a blind spot in a vision of a driver is determined.

The blind spot in the vision of the driver can be determined accurately by the relative location information between the driver and the sight-blocking object that blocks the vision of the driver. Further, the blind spot in the vision can be determined more accurately in connection with the structure information of the sight-blocking object, such that the information of the blind spot in the vision can be accurately transmitted to the driver by the following steps. Specifically, the relative location information between the driver and the sight-blocking object that blocks the vision of the driver may be determined via a distance sensor. In the case when the sight-blocking object is an A pillar, the distance sensor may be located on the A pillar or the driver seat. In details, the distance sensor emits a signal and measures a time interval from the time when this signal is emitted to the time when this signal is reflected back from the target object, such that the distance between the distance sensor and the target object can be calculated according to the time interval. The distance sensor may include an ultrasonic range sensor, a foldable infrared range sensor, a foldable 24 GHZ radar and the like. after acquiring the distance between the distance sensor and the target object, the both coordinate values of the driver and the sight-blocking object can be determined in the same coordinate, and the blind spot caused by the sight-blocking object (an A pillar) and a region within a certain angle range in the direction from the A pillar to the outside of the vehicle's body (as shown in FIG. 2, the regions within the angle range YOZ and YOE) can be further determined in connection with the structure information of the sight-blocking object including the shape, the area, the ends and/or the tops of the edges of the sight-blocking object. Further, in connection with the preset vehicle parameter and the structure information of the A pillar, the blind spot in the vision caused by the A pillar (as shown in FIG. 2, the regions within the angle range YOZ and YOE) may be determined by a 3D model of the compartment which is created by the real-time image obtained by an image device inside the compartment, and the details thereof will be described below.

In S300, environmental information of the blind spot in the vision is determined in accordance with the 3D map, the current location of the vehicle in the 3D map and the blind spot in the vision of the driver.

In view of the above S100 and S200, the 3D map in front of the vehicle including the current location of the vehicle in the environment where the vehicle is, the current location of the vehicle in the 3D map and the blind spot in the vision of the driver are determined. The environmental information of the blind spot in the vision can be obtained by effective recombination of the valid data of the acquired 3D map, the location of the vehicle in this 3D map and the blind spot in the vision through SLAM visual technology. The valid data may include feature points in the 3D map, the specific location of the vehicle in the 3D map, the specific angle range of the blind spot in the vision of the driver (as shown in FIG. 2, the regions within the angle range YOZ and YOE) and the like. The valid data is extracted and recombined with the same scale in the same coordinate through SLAM visual technology, such that the environmental information regarding the blind spot in the vision can be determined in the 3D map. The blind spot in the vision that is caused by the sight-blocking object (especially, the A pillar) for the driver can be determined with a small number of image devices in the present disclosure. Thereby, in connection with the environmental information of the blind spot in the vision determined by the 3D map and without infecting capacity of the compartment and aesthetics of the vehicle, the number of the hardware device for visualization of vehicle's blind spot can be reduced and the devices are easy to be mounted, which results in the decreased economic cost and time cost for achievement of visualization of vehicle's blind spot.

Further, after the step S300 of determining environmental information of the blind spot in the vision in accordance with the 3D map, the location of the vehicle in the 3D map and the blind spot in the vision of the driver, the method may further include the following steps.

In S310, environmental information of the blind spot in the vision in real-time is detected, so as to determine whether a target object is presented in the blind spot in the vision; and warning information is sent if presented.

After determining the environmental information of the blind spot in the vision, the detecting an specific target object pertaining to environmental information of the blind spot in the vision in real-time includes: detecting other obstacles such as pedestrians, vehicles, buildings, plants or the like and determining the distance between the respective target object and the vehicle or estimating changes of the distance between the respective target object and the vehicle at the same time, so as to determine the target object that may cause a traffic accident and send a warning information to the driver. The warning information may be a text prompt for example displayed as "there is a pedestrian within 2 meters from the right side of the vehicle in the traveling direction". The detection for the target object is to detect target object information from the 3D map and the used detection method is for example image recognition technology. Alternatively, the target object information can be determined according to the height and/or the volume of the target object, that is, a threshold for the height and/or the volume is set in advance. When an object has a height and/or a volume greater than the preset threshold, this target object is determined as the target object. After the target object in the blind spot in the vision is obtained, the distance between the respective target object and the vehicle's body may be determined; or it may estimate the changes of the distance between the respective target object and the vehicle over time and subsequently may determine whether the target object is a target object that is possible to cause a traffic accident, so as to send a warning information to the driver. The warning information may include a voice prompt (for example, broadcasting that there is a pedestrian within 2 meters from the right side of the vehicle in the traveling direction) or a text prompt (for example, displaying on the display device in compartment or projecting inside the compartment that there is a pedestrian within 2 meters from the right side of the vehicle in the traveling direction). Alternatively, the warning information is carried out in the form of which the target object in the blind spot in the vision is flickered or highlighted on a display device, or be projected inside the compartment of the vehicle. Determination of the distance between the target object and the vehicle's body or estimation of the changes of the distance between the target object and the vehicle over time can be performed by SLAM visual technology; alternatively, tracking the target object in the blind spot in the vision during traveling can be realized by way of technologies such as camshaft, kalman, Meanshift, particle filter or the like, so as to determine the location information of the target object and determine a linear relationship between the location information of the target object in the blind spot in the vision and the location information of the vehicle in connection with the location information of the vehicle. The target object in the blind spot in the vision that is possible to cause a traffic accident can be determined by analyzing this linear relationship to determine the distance between the target object and the vehicle, or by estimating the changes of the distance between the target object and the vehicle over time. In addition, the distance between the target object and the vehicle in the blind spot in the vision may also be determined in accordance with a scale of the 3D map and a scale in real world, and it is then possible to further determine the target object that is possible to cause a traffic accident.

In an embodiment of the present disclosure, after the step S300 of determining environmental information of the blind spot in the vision in accordance with the 3D map, the current location of the vehicle in the 3D map and the blind spot in the vision of the driver, the method may further include the following step.

In S320, the environmental information of the blind spot in the vision is displayed inside the compartment of the vehicle.

As described above in S310, in order to enable the driver to acquire the environmental information of the blind spot in the vision more visually, the environmental information of the blind spot in the vision is displayed on a display device inside the compartment of the vehicle, and the display device may be mounted on the center of the dashboard inside the vehicle and/or the dashboard in front of the steering wheel, which is convenient for the driver to view the environmental information on the display device, thereby, the driver can further determine whether a target object that is possible to cause a traffic accident is existed in the blind spot in the vision directly. The target object in the blind spot in the vision may also be displayed inside the compartment via a projector, and such display manner may be maintained with a low cost, thereby saving the economic cost for visualization of vehicle's blind spot. In addition, in order to be convenient for viewing and enable to display the most real environmental information on a display device, the environmental information of the blind spot in the vision can be projected onto the center of the dashboard inside the vehicle and/or the dashboard in front of the steering wheel.

According to an embodiment, the step S200 of acquiring the relative location information between the driver and the sight-blocking object that blocks the vision of the driver may include S210 and S220.

In S210, real-time image data of the inside of the compartment is acquired and a compartment 3D model regarding the inside of the compartment is created.

The relative location information between the driver and the sight-blocking object that blocks the vision of the driver is described in the above step S200. In order to determine the environmental information of the blind spot in the vision in connection with the image data as described in step S100, the SLAM visual technology may be used. Specifically, an image device captures the image inside the compartment in real time. The angle range of the real-time image that the image device can capture is the angle range IOJ as shown in FIG. 2. The real-time image angle range IOJ inside the compartment mostly includes the information regarding the driver, the seats inside the compartment and the sight-blocking object. The location changes of the driver between the real-time image data in different frames may be extracted from the inside of the compartment and motion parameters of the driver, the seats inside the compartment and the sight-blocking object may be estimated by RANSAC, subsequently, the motion parameters of the driver, the seats inside the compartment and the sight-blocking object may be converted into the same coordinate system to acquire a 3D model regarding the inside of the compartment. It is noted that when creating the 3D model for the inside of the compartment, the extracted parameters mostly includes feature points on the driver, the seats inside the compartment and the sight-blocking object in the images of different frames, such as the points where the driver's nasal tip is, where the left corner of the driver's mouth is, where the inside and outside canthi of driver's eyes are, where the ends and/or tops on the profile of the driver's seat are or where the tops on the profile of the sight-blocking object are. The corresponding feature points are found from image data of contiguous frames or alternate frames and are matched, thereby converting each feature point of frames into the same coordinate system and determining the compartment 3D model including the driver. In an embodiment, the image device can be mounted on a side of the mirror and the real-time image data of the inside of the compartment can be obtained by this image device. The image device may also be mounted on a side of the display device inside the compartment, which results in the decreased influence on aesthetics of the vehicle and capacity of the compartment. In addition, it is possible to use the same SLAM visual technology to create the compartment 3D model, so as to facilitate to combine the 3D map and the 3D model of the compartment, which is helpful to simplify the operation. According to an embodiment, in order to plan the space inside the compartment suitably, the environmental information of the blind spot in the vision can be projected on a preset position when using projector, thereby providing for the driver the visible environmental information of the blind spot in the vision without changing the driving habit of the driver.

In S220, a coordinate system is created, the coordinate values of the driver and the sight-blocking object in the coordinate system are determined according to the compartment 3D model and the relative location information between the driver and the sight-blocking object is calculated.

In S230, the relative location information between the driver and the sight-blocking object that blocks the vision of the driver is acquired and the blind spot in the vision of the driver is determined in connection with structure information of the sight-blocking object.

In order to conveniently determine the locations of the drivers and the sight-blocking object, a coordinate system is created, the driver and the sight-blocking object are converted into the same coordinate system, the coordinate values are determined by the coordinate system and the distance between the driver and the sight-blocking object and the angles between a coordinate axis and lines that are generated by connecting the driver and the sight-blocking object with the origin are determined in accordance with the coordinate values of the driver and the sight-blocking object and the origin of the coordinate system. For example, in order to conveniently determine the relative location information, in the created coordinate system, assuming that the coordinate value of the point O representing the driver is (x, y, z) and the coordinate value of the sight-blocking object is (x1, y1, z1), the distance between the driver and the sight-blocking object is $\sqrt{(x-x1)^2+(y-y1)^2+(z-z1)^2}$. After connecting the sight-blocking object with the origin, the angle between the x axis and the line from the sight-blocking object to the origin is $\cos^{-1}$ $$\frac{x'x1 + y'y1 + z'z1}{\sqrt{x^2 + y^2 + z^2} \cdot \sqrt{x1^2 + y1^2 + z1^2}},$$

thereby determining the relative location between the driver and the sight-blocking object. The blind spot in the vision can be determined according to the relative location in following steps.

In an embodiment, before the step S100 of acquiring real-time image data in front of the vehicle, creating a Three-Dimension (3D) map with the acquired image data and determining a current location of the vehicle in the 3D map, the method may further include the following steps.

In S101, parameter information of the vehicle's body and the structure information of the sight-blocking object are preset. The structure information of the sight-blocking object includes at least one of lengths of edges of the sight-blocking object, tops and/or ends of the edges of the sight-blocking object, an intersection of the edges of the sight-blocking object and an area of a surface of the sight-blocking object that faces the driver.

In order to more accurately determine the blind spot in the vision of the driver and reduce the time for determining the blind spot in the vision, when parameters of the vehicle's body and the structure information of the sight-blocking object are preset and the 3D map is created, the parameters of the vehicle's body may be invoked directly to create the 3D map including the vehicle. The parameters of the vehicle's body in the 3D map may be scaled down based on the preset ratio and after the relative location between the sight-blocking object and the driver is determined, at least one kind of the actual information of the structure information, such as lengths of edges of the sight-blocking object, tops and/or ends of the edges of the sight-blocking object, an intersection of the edges of the sight-blocking object or an area of a surface of the sight-blocking object that faces the driver, is acquired to serve as a basis for scaling down when creating the 3D model. In the case when the coordinate system is not created, lengths of edges of the sight-blocking object, tops and/or ends of the edges of the sight-blocking object and an intersection of the edges of the sight-blocking object may be obtained and the driver may be connected with each top and/or end and each intersection of the edges of the sight-blocking object through a straight line. The straight line is extended away from the driver along the sight-blocking object so as to acquire the blind spot in the vision.

In an embodiment, the step S200 of determining the blind spot in the vision of the driver in connection with structure information of the sight-blocking object may include S201 and S203.

In S201, coordinate values of the ends and/or the tops of the edges of the sight-blocking object in the coordinate system is acquired.

When the coordinate system is created, as described above, the coordinate system is not only used to determine the relative location between the driver and the sight-blocking object, but also determine the coordinate values of the ends and/or the tops of the edges of the sight-blocking object in the coordinate system, such that it is beneficial to determine the blind spot in the vision more accurately. When the edges of the sight-blocking object are arched, the determined coordinate values include the coordinate values of the ends and/or the tops of the edges of the sight-blocking object; when the edges of the sight-blocking object are straight, the determined coordinate values include the coordinate values of the ends and/or the tops of the edges of the sight-blocking object.

In S202, in the compartment, the reference point is a point defined by the coordinate values where the driver is; the reference point is connected with the tops and/or ends of the edges of the sight-blocking object that blocks the vision of the driver through a straight line.

In S203, the straight line is extended away from the driver from a start point towards an eyesight direction of the driver, wherein the start point is determined by an intersection between the edge of the sight-blocking object and the straight line; and a region which is enclosed by the straight line and the sight-blocking object and away from the driver is the blind spot in the vision.

When the points corresponding to the coordinate values of the ends and/or the tops of the edges of the sight-blocking object and the point corresponding to the coordinate value of the driver in the coordinate system are determined in step S201, the point defined by the coordinate values where the driver is as the reference point, and the reference point is connected with the tops and/or ends of the edges of the sight-blocking object that blocks the vision of the driver through a straight line. Alternatively, the coordinate values of the ends and/or the tops on the facial features of the driver, especially the coordinate values corresponding to the canthi of the eyes in the coordinate system, are determined in the coordinate system, and the intermediate point between two inside canthi is as the starting point to extend forward so as to form a boundary. The coordinate values of two canthi pertaining to driver's one eye are connected with the coordinate values of the ends and/or the tops of the edges of the sight-blocking object through a straight line and the straight line is extended away from the driver along the ends and/or the tops of the edges of the sight-blocking object (for example, OY, OZ, OD and OD as shown in FIG. 2). The starting point for extension is the intersections of the edges of the sight-blocking object, and the extended straight line and the region away from the driver are the blind area of the vision (as shown in FIG. 2, the regions within the angle range YOZ and YOE), that is, the extended straight line and the region where the sight-blocking object is away from the driver are located outside the vehicle's body. When the sight-blocking object is an A pillar, the blind area is located in front of the driver and outside the vehicle's body. When the sight-blocking object is a B pillar or a C pillar, the blind area is located behind the driver and outside the vehicle's body. It is easy and accurate to determine the blind spot in the vision by geometric connection and extension. In addition, it is possible for vectors of the straight lines and the method for solving angles with the vectors to acquire more accurate angel range of the blind spot in the vision by creation of a coordinate system and extension of the coordinate values.

In an embodiment, the step S100 of determining a current location of the vehicle in the 3D map may include the following step.

In S102, a body model of the vehicle in the 3D map is created based on a reference point according to the parameter information of the vehicle's body and determining the current location of the vehicle in the 3D map, wherein the reference point is a position of a device for acquiring real-time image data of the inside of the compartment of the vehicle, and the current location of the vehicle in the 3D map is determined.

When creating the 3D map, it is needed to determine the location of the vehicle in the 3D map. Thus, a reference point is needed and according to the relationship between this reference point and the vehicle parameters, a body model can be created in the 3D map, thereby determining the location of the vehicle in this 3D map. For example, when taking the acquired location of the real-time data device as the reference point for creation of the body model in the 3D map, since the coordinate system has been created as described in the above steps, the locations of the points corresponding to the acquired real-time image data in the coordinate system can be determined. Assuming that in the parameters of the vehicle's body, the length from the ends and/or tops of the edges of the A pillar on the vehicle is L and the angel is N, L is scaled down to M according to the ratio between the 3D map and the real world. The location of the A pillar of the vehicle in the 3D map can be determined based on M and N. Other parameters of vehicle's body may be located in the 3D map in accordance with the above steps, and thus a body model can be created in the 3D map, thereby determining the current location of the vehicle in the 3D map. When the scale of the 3D map is low with respect to the real world and the environmental information cannot be discerned from the 3D map, the location of the reference point of the vehicle may be the current location of the vehicle in the 3D map. In addition, the reference point is not intended to be limited to the location of the device that acquires real-time image data, and it can be set as other component or other point.

According to an embodiment, the 3D map and/or the compartment 3D model is created by Simultaneous Localization and Mapping (SLAM).

The creating the 3D map and/or the compartment 3D model by SLAM includes the following steps S510-S530.

In S510, real-time image data in front of the vehicle/real-time image data of the inside of the compartment of the vehicle is acquired, feature points of the real-time image data in front of the vehicle/the real-time image data of the inside of the compartment of the vehicle are extracted and the feature points of the real-time image data in front of the vehicle/the real-time image data of the inside of the compartment of the vehicle in different frames are matched.

The real-time image data in front of the vehicle/real-time image data of the inside of the compartment of the vehicle is acquired from an image device and the feature points are extracted from the image data. The method for extracting the feature points may include ORB and SIFT. ORB is an algorithm for quickly extracting and describing the feature points, which includes two parts: one is to extract the feature points and other is to describe the feature points. The characteristic of ORB is to combine the detection method of FAST feature points and BRIEF feature description. The characteristic of FAST is to define a feature point direction, such that the feature point may possess rotation invariance. This method mainly includes the following steps: step one is to extract an amount of feature points including feature points of low quality, feature of a feature point is to select a point from the real-time image data as a center and a circle with a radius of 3 pixels is drawn, there are n continuous pixels having a gray scale value greater than or smaller than that of the point on the circumference; step two is to input the feature points into a decision tree trained with ID3 algorithms and acquire an optimal FAST feature points; step three is to acquire the feature point with a large response by an operational mode that calculates a sum of absolute values of deviations between the feature point and other surrounding feature points; step four is to set a scale factor and the number of levels in a pyramid, n levels, the original image is scaled down to n levels images in accordance with the scale factor, the scaled image is I'=I/scale Factork (k=1, 2, . . . , n levels) and the sum of the feature points with different scales which are extracted from the n levels image is used as the FAST feature point of this image; and step five is to calculate, by a moment, a centroid of the feature point within a range with a radius of r, a vector which is formed of connecting the coordinate of the feature points with the centroid serves as the direction of this feature point. The result calculated by BRIEF algorithm is a feature descriptor of a binary string. This algorithm is to select n pairs of pixel points $p_i$, $q_i$ (i=1, 2, ..., n) within a neighbourhood of a feature point and compare magnitudes of grey scales I of pairs of points with each other. If $I(p_i)>I(q_i)$, the result of the binary string is 1; otherwise, the result is 0. After all pairs of the points have been compared, a binary string with a length of n is generated. Generally, n is equal to 128, 256 or 512. In addition, noise immunity of the feature descriptor is enhanced by Gaussian smoothing. The method for selecting the pair of points from an area of feature points includes the following steps: 1) samples are averaged in an image block; 2) p and q are in conformity with Gaussian distribution of (0, S2/25); 3) p is in conformity with Gaussian distribution of (0, S2/25) and q is in conformity with Gaussian distribution of (0, S2/100); 4) random sampling is performed at discrete locations in the quantized space polar coordinate system; and 5) p is fixed at (0, 0) and q is acquired by sampling uniformly around p. In addition, the above-mentioned method may be realized by the improved rBRIEF algorithms.

SIFT features not only possess scale invariability, but also get a good detection result even though a rotation angle, image brightness or a view angle is changed. The method for extracting SIFT feature points includes the following steps: 1. Gaussian convolution kernel is used as the only linear kernel to achieve scale transformation, Gaussian differential scale space is generated with Gaussian differential kernel with different scales and image convolution, that is, the image pyramid; 2. the extreme point of DOG scale space is detected and a feature point of the image at the scale is determined; 3. an approximate Harris Corner detector is used to accurately determine the location and the scale of the key points by simulating a 3D quadratic function, which may achieve a sub-pixel accuracy, while the key points with low contrast and unstable edge response points are removed to enhance stability for match and improve noise immunity; 4. a direction for each feature point is calculated with the determined feature points in each image and further calculation are performed based on this direction; a direction parameter is specified for each key point by using the gradient direction distribution characteristic of neighbourhood pixels in the key points such that the operator possesses rotation invariance; 5. the coordinate axes is rotated to the direction of the key points to ensure rotation invariance, the gradient magnitude and the gradient direction of each pixel are given by equations, the direction of the arrow represents the gradient direction of this pixel and the length of the arrow represents the modulus of the gradient, and then a Gaussian window is used to perform the weighted operation; and 6. the generated images are matched according to SIFT, the descriptor of each scale in the two images are matched, matching of 128 dimensions represents that the two feature points are matched with each other, that is to say, the feature points of the real-time image data in different frames are matched, the matching may refer to that the feature points of the image data in contiguous frames are matched or the feature points of the image data in alternate frames are matched.

In S520, a motion parameter of the 3D map is estimated based on feature points the successfully matched of the real-time image data in front of the vehicle/the real-time image data of the inside of the compartment of the vehicle in different frames and a normalization algorithm of the feature points.

In S530, the feature points of the real-time image data in front of the vehicle/the real-time image data of the inside of the compartment of the vehicle in all frames are converted to the same coordinate system in accordance with the motion parameter and the 3D map and/or the compartment 3D model are created.

After the feature points are matched successfully, some of the feature points may be matched in error, there is thus needed to perform the normalization algorithm of the feature points to remove the incorrectly matched feature points. The normalization algorithm of the feature points may include RANSAC algorithm or ICP algorithm, thus estimating the motion parameter of the 3D map. The RANSAC algorithm may include the following steps: 1. Four data samples, which are not collinear, are selected randomly from a data set to calculate the transformation matrix H, denoted as model M; 2. The projection error between all data in the data set and the model M is calculated, if the error is less than the threshold, the data sample is add to interior point set I; 3. If the number of elements in the interior pint set is greater than that of optimal interior point set at present, then the interior pint set is updated while updating the order of iteration k; and 4. If the order of iteration is greater than k, then exit, otherwise, the order of iteration increments and the above steps are repeated to obtain the correctly matched feature points; the motion parameter is estimated according to the changes of the feature points of the real-time image data, that is, the location of the real-time image in one or more of the immediately following frames where the feature point of the real-time image data is, and the correctly matched feature points in all frames are converted to the above coordinate system so as to acquire the 3D map/the 3D model. ICP algorithm is a point set to point set alignment method. In this method, the distance for each point in a cloud for target points is calculated from each point in a cloud for source points to match each point with a closest point in the target cloud, such that the precondition of the algorithm for aligning the corresponding point sets is met, that is, each point possesses a corresponding mapped point. At this time, calculations can be performed according to the algorithm for aligning the corresponding point sets. However, since the above processes are performed based on an assumption, the calculations shall be iterated repeatedly until the mean square error is smaller than a threshold, that is to say, every time iteration is performed, the entire model becomes closer and the closest point is re-matched once. Subsequently, the calculations are performed according the algorithm for aligning the corresponding point sets to compare the mean square errors. If the mean square error is not met, continue to perform iteration, until the mean square error is smaller than a threshold. In addition, the present disclosure may further operate by other algorithm for removal of the incorrectly matched feature points.

In an embodiment, the sight-blocking object is an A pillar of the vehicle.

As described above, the image device is mounted on the front of the vehicle and is mainly configured to acquire the real-time image data in front of the vehicle. The A pillar is on the front of the vehicle's body. The blind spot in the vision of the driver caused by the A pillar can be obtained according to the above steps. Accordingly, the image device may also be mounted on the top or the rear of the vehicle and be configured to acquire the real-time image data on both sides of the vehicle or in rear of the vehicle. The blind spot in the vision of the driver caused by B and C pillars can be obtained according to the above steps.

In an embodiment, the warning information may include a voice prompt or a text prompt, or the warning information is carried out in the form of which the target object in the blind spot in the vision is flickered or highlighted inside the compartment of the vehicle.

As described above, when the target object in the environmental information of the blind spot in the vision, the environmental information of the blind spot in the vision and the blind spot in the vision are determined, if a target object is found, a warning may be sent to the driver by a voice prompt or a text prompt, or the target object in the blind spot in the vision is flickered or highlighted inside the compartment of the vehicle so as to remind the driver, thereby a traffic accident may be avoided.

A device for visualization of vehicle's blind spot, as shown in FIG. 2, includes creating module 10 for creating a map, a determining module 20 for determining a blind spot and an acquiring module 30 for acquiring a target object in a blind spot.

The creating module 10 is configured to acquire real-time image data in front of the vehicle, create a Three-Dimension (3D) map with the acquired image data and determine a current location of the vehicle in the 3D map.

The determining module 20 is configured to a blind spot in a vision of a driver.

The acquiring module 30 is configured to determine environmental information of the blind spot in the vision in accordance with the 3D map, the current location of the vehicle in the 3D map and the blind spot in the vision of the driver.

According to the present disclosure, the above mentioned "module" can be implemented by the hardware with corresponding configuration, for example, including various integrated or separate hardware entities, such as the corresponding logic circuit and external device.

A terminal for visualization of vehicle's blind spot includes a processor and a memory. The memory is configured to store computer program which realizes the method according to any one of the above methods when executed by the processor.

A system for visualization of vehicle's blind spot includes the above terminal for visualization of vehicle's blind spot and an image device which is configured to capture real-time image data and send the real-time data to the terminal.

A vehicle includes the above system for visualization of vehicle's blind spot.

A method, a device, a terminal, a system and a vehicle for visualization of vehicle's blind spot of the present disclosure optionally may be used for visualization of the blind spot caused by the A pillar of the vehicle, or may be suitable for visualization of the blind spot caused by the B pillar, C pillar or other sight-blocking object of the vehicle. For the A pillar of the vehicle, the image device captures the real-time image in front of the vehicle and/or inside the compartment of the vehicle in real-time. The terminal of the system for visualization of vehicle's blind spot in the vehicle acquires the real-time image data, creates the 3D map in front of the vehicle and the 3D model regarding the inside of the compartment by SLAM, creates the body model in the 3D map in accordance with the parameter of the vehicle's body and the component information of the vehicle preset in the terminal and determines the location of the vehicle in the 3D map. Since the coordinate system has been created when creating the 3D map and the 3D model and the driver and the sight-blocking object has been included in the coordinate system, it facilitates to determine the relative location information between the driver and the sight-blocking object by solving the formula regarding the distance and the angle with the coordinate values of the driver and the sight-blocking object. Subsequently, in combination with the component information of the sight-blocking object including the coordinate values of ends and/or tops of the edges of the sight-blocking object, the point of the driver and the ends and/or tops of the edges are connected via a straight line and extended toward the front of the driver, thereby the blind spot in the vision of the driver can be determined in connection with the planes that are constituted by connecting the ends and/or tops of the edges. This blind spot is caused by the A pillar and is located on the surrounding environment in front of the vehicle. Because the compartment 3D model and the 3D map are created based on the same coordinate system, the environmental information in blind spot in the vision can be acquired by overlapping the compartment 3D model and the 3D map. It is determined whether the target object exists in the blind spot in the vision by image recognition or comparison of the thresholds of the height and/or the volume in the environmental information of the blind spot of the vision. When the target object exists, a distance between the target object and the vehicle is calculated or a linear relationship of distance changes from the target object to the vehicle over time is determined. And then, it is determined whether a moment when the distance from the target object to the vehicle in the 3D map is less than the preset safe distance exists. Optionally, the distance may be a distance from the target object to one of both sides of the vehicle less than the preset safe distance, or preferably a distance from the target object to the front of the vehicle in the traveling direction. If exists, a voice prompt or a text prompt will be sent to the driver or the environmental information including the target object is flickered or highlighted inside the compartment of the vehicle, such that the driver can take measures to prevent the traffic accident from occurrence in advance and driving security can be realized. Since the terminal and the image device can realize the visualization of vehicle's blind spot based on the existing dashboard, mirrors or the display device, the influence for aesthetics of the vehicle and capacity of the compartment is reduced.

In addition, the functional units in the embodiments of the present disclosure may be integrated on one processing module or may be physical units that separately exist. Alternatively, two or more units are integrated on one module. The above modules may be realized by hardware or in form of software functional models. When the above integrated modules are realized in form of software functional modules and are sold or used as the separate product, these methods can be programmed as computer program and stored in a storage medium readable for a computer.

The above mentioned storage medium may be a ROM, a disc, an optical disc or the like.

Further, at least one of the following advantages can be realized by embodiments of the present disclosure.

1. In the method, the device, the terminal and the vehicle for visualization of vehicle's blind spot of the present disclosure, the real-time image data in front of the vehicle is acquired with less external devices; the acquired image data is created as the 3D map via visual technologies and the current location of the vehicle in this 3D map is determined; the relative location between the driver and the sight-blocking object that blocks the vision of the driver is acquired based on the known vehicle information and the location information of the driver and the blind spot of the vision of the driver is determined in connection with the structure information of the sight-blocking object; and the environmental information of the blind spot in the vision is determined in accordance with the 3D map, the current location of the vehicle in the 3D map and the blind spot in the vision of the driver. In the present disclosure, using less external device of the vehicle and in combination with the existing internal devices of the vehicle, the economic cost for visualization of blind spot is reduced, and the 3D map is created by visual technologies while the actual location information of the vehicle can be determined, which results in that the time cost for visualization of blind spot is reduced. Since the devices that are used to acquire the real-time images have been existed on the vehicle or a small number of devices that are used to acquire the real-time images are mounted additionally, visualization of vehicle's blind spot can be realized without infecting aesthetics of the vehicle.

2. The environmental information of the blind spot of vision can be detected by the method, the device, the terminal and the vehicle for visualization of vehicle's blind spot of the present disclosure in real time, so as to determine whether a target object that may cause a traffic accident exists in the blind spot of the vision. When the target object exists, a warning information is sent to the driver such that the driver can take measures to take care in advance, thereby preventing the traffic accident from occurrence in real time.

3. In the method, the device, the terminal and the vehicle for visualization of vehicle's blind spot of the present disclosure, in order to visibly acquire the environmental information of the blind spot for the driver, the environmental information of the blind spot is displayed inside the compartment or on the display device by a projector such that the driver can view the displayed environmental information of the blind spot of the vision and determine whether a target object that may cause a traffic accident exists, thereby preventing the traffic accident from occurrence.

4. In the method, the device, the terminal and the vehicle for visualization of vehicle's blind spot of the present disclosure, in order to accurately determine the environmental information of the blind spot, a 3D model regarding the inside of the compartment is created, thereby, accurate determination of the blind spot in the vision can be determined in accordance with the location information of the same coordinate system of the sight-blocking object and the driver in the 3D model.

5. In the method, the device, the terminal and the vehicle for visualization of vehicle's blind spot of the present disclosure, when the component information of the sight-blocking object, the location information of the sight-blocking object and the location of the driver are determined, the environmental information of the blind spot of the vision can be determined by simple geometric lines.

6. The method, the device, the terminal and the vehicle for visualization of vehicle's blind spot of the present disclosure may decrease the influence of the blind spot to the driver that is caused by an A pillar of the vehicle. The environmental information that sight-blocking object by the A pillar of the vehicle is acquired by the camera on front of the vehicle, thereby the traffic accident caused by the A pillar of the vehicle in the blind spot of the vision can be prevented.

7. In the method, the device, the terminal and the vehicle for visualization of vehicle's blind spot of the present disclosure, in order to clearly acquire the environmental information of the blind spot of the vision for the driver, a warning may be sent to the driver by a voice prompt or a text prompt, or the target object in the blind spot in the vision is flickered or highlighted inside the compartment of the vehicle. When the driver do not view the environmental information displayed inside the compartment, the voice prompt may provide a warning acoustically such that the driver can definitely determine the target object in the blind spot and the information of the target object that may cause a traffic accident, thereby preventing the traffic accident from occurrence; when the driver watches the display device and the distance between the target object and the vehicle or the information of the target object is not explicit, the distance between the target object and the vehicle or the information of the target object can be determined by the text prompt, thereby preventing the traffic accident from occurrence. In addition, in order to avoid that the driver cannot see the target object in the blind spot displayed inside the compartment, the target object in the blind spot in the vision is flickered or highlighted, such that the driver may pay more attention to the target object in the blind spot to determine the possibility for causing a traffic accident in the blind spot of the vision, thereby preventing the traffic accident from occurrence.

The above descriptions are merely a part of the implementations. It is noted for those skilled in the art that various modifications and variants can be made without departing from the principle of the present disclosure, and such modifications and variants shall be deemed as the protecting scope of the present disclosure.

What is claimed is:

1. A method for visualization of vehicle's blind spot, comprising:
   acquiring real-time image data in front of the vehicle;
   creating a Three-Dimension (3D) map with the acquired image data;
   determining a current location of the vehicle in the 3D map;
   determining a blind spot in a vision of a driver; and
   determining environmental information of the blind spot in the vision in accordance with the 3D map, the current location of the vehicle in the 3D map and the blind spot in the vision of the driver,
   wherein the step of determining a blind spot in a vision of a driver comprises:
   acquiring real-time image data of an inside of the compartment of the vehicle to create a compartment 3D model regarding the inside of the compartment of the vehicle;
   creating a coordinate system;
   determining coordinate values of the driver and a sight-blocking object in the coordinate system based on the compartment 3D model;
   calculating relative location information between the driver and the sight-blocking object;
   acquiring the relative location information between the driver and the sight-blocking object that blocks the vision of the driver; and
   determining the blind spot in the vision of the driver in connection with structure information of the sight-blocking object and the relative location information between the driver and the sight-blocking object that blocks the vision of the driver.

2. The method according to claim 1, wherein, after the step of determining environmental information of the blind spot in the vision in accordance with the 3D map, the current location of the vehicle in the 3D map and the blind spot in the vision of the driver, the method further comprises:
   detecting environmental information of the blind spot in the vision in real-time, so as to determine whether a target object is presented in the blind spot in the vision; and
   sending warning information if presented.

3. The method according to claim 2, wherein the warning information comprises a voice prompt or a text prompt, or the warning information is carried out in the form of which the target object in the blind spot in the vision is flickered or highlighted inside the compartment of the vehicle.

4. The method according to claim 1, wherein after the step of determining environmental information of the blind spot in the vision in accordance with the 3D map, the current location of the vehicle in the 3D map and the blind spot in the vision of the driver, the method further comprises:
displaying the environmental information of the blind spot in the vision inside the compartment of the vehicle.

5. The method according to claim 1, wherein, before the steps of acquiring real-time image data in front of the vehicle, creating a Three-Dimension (3D) map with the acquired image data and determining a current location of the vehicle in the 3D map, the method further comprises:
pre-setting parameter information of the vehicle's body and the structure information of the sight-blocking object;
wherein the structure information of the sight-blocking object comprises at least one of lengths of edges of the sight-blocking object, tops or ends of the edges of the sight-blocking object, an intersection of the edges of the sight-blocking object and an area of a surface of the sight-blocking object that faces the driver.

6. The method according to claim 5, wherein the step of determining the blind spot in the vision of the driver in connection with structure information of the sight-blocking object comprises:
acquiring coordinate values of the ends or the tops of the edges of the sight-blocking object in the coordinate system;
connecting, in the compartment 3D model, a reference point with the tops or ends of the edges of the sight-blocking object that blocks the vision of the driver through straight lines, wherein the reference point is a point defined by the coordinate values where the driver is; and
extending the straight lines away from the driver from a start point towards an eyesight direction of the driver, wherein the start point is determined by an intersection between the edge of the sight-blocking object and the straight lines,
wherein a region which is enclosed by the straight lines and the sight-blocking object and is away from the driver is determined as the blind spot in the vision.

7. The method according to claim 5, wherein the step of determining a current location of the vehicle in the 3D map comprises:
creating a body model of the vehicle in the 3D map based on a reference point according to the parameter information of the vehicle's body and determining the current location of the vehicle in the 3D map, wherein the reference point is a position of a device for acquiring real-time image data of an inside of the compartment of the vehicle.

8. The method according to claim 1, wherein, before the steps of acquiring real-time image data in front of the vehicle, creating a Three-Dimension (3D) map with the acquired image data and determining a current location of the vehicle in the 3D map, the method further comprises:
pre-setting parameter information of the vehicle's body and the structure information of the sight-blocking object;
wherein the structure information of the sight-blocking object comprises at least one of lengths of edges of the sight-blocking object, tops or ends of the edges of the sight-blocking object, an intersection of the edges of the sight-blocking object and an area of a surface of the sight-blocking object that faces the driver.

9. The method according to claim 8, wherein the step of determining the blind spot in the vision of the driver in connection with structure information of the sight-blocking object comprises:
acquiring coordinate values of the tops or ends of the edges of the sight-blocking object in the coordinate system;
connecting, in the compartment 3D model, a reference point with the tops or ends of the edges of the sight-blocking object that blocks the vision of the driver through a straight line, wherein the reference point is a point defined by the coordinate values where the driver is; and
extending the straight line away from the driver from a start point towards an eyesight direction of the driver, wherein the start point is determined by an intersection between the edge of the sight-blocking object and the straight line,
wherein a region which is enclosed by the straight line and the sight-blocking object and away from the driver is determined as the blind spot in the vision.

10. The method according to claim 8, wherein the step of determining a current location of the vehicle in the 3D map comprises:
creating a body model of the vehicle in the 3D map based on a reference point according to the parameter information of the vehicle's body and determining the current location of the vehicle in the 3D map, wherein the reference point is a position of a device for acquiring real-time image data of the inside of the compartment of the vehicle.

11. The method according to claim 1, wherein the 3D map or the compartment 3D model is created by Simultaneous Localization and Mapping (SLAM).

12. The method according to claim 1, wherein the 3D map or the compartment 3D model is created by Simultaneous Localization and Mapping (SLAM).

13. The method according to claim 12, wherein the step of creating the 3D map or the compartment 3D model by SLAM comprises:
acquiring real-time image data in front of the vehicle or real-time image data of the inside of the compartment of the vehicle;
extracting feature points of the real-time image data in front of the vehicle or the real-time image data of the inside of the compartment of the vehicle;
matching the feature points of the real-time image data in front of the vehicle or the real-time image data of the inside of the compartment of the vehicle in different frames;
estimating a motion parameter of the 3D map based on the feature points successfully matched of the real-time image data in front of the vehicle or the real-time image data of the inside of the compartment of the vehicle in different frames and a normalization algorithm of the feature points;
converting the feature points of the real-time image data in front of the vehicle or the real-time image data of the inside of the compartment of the vehicle in all frames to a same coordinate system in accordance with the motion parameter; and
creating the 3D map or the compartment 3D model.

14. The method according to claim 1, wherein the sight-blocking object is an A pillar of the vehicle.

15. A method for visualization of vehicle's blind spot, comprising:
   acquiring real-time image data in front of the vehicle;
   creating a Three-Dimension (3D) map with the acquired image data;
   determining a current location of the vehicle in the 3D map;
   determining a blind spot in a vision of a driver; and
   determining environmental information of the blind spot in the vision in accordance with the 3D map, the current location of the vehicle in the 3D map and the blind spot in the vision of the driver,
   wherein the step of determining a blind spot in a vision of a driver comprises: acquiring real-time image data of an inside of the compartment of the vehicle to create a compartment 3D model regarding the inside of the compartment of the vehicle;
   wherein the 3D map or the compartment 3D model is created by Simultaneous Localization and Mapping (SLAM),
   wherein the step of creating the 3D map or the compartment 3D model by SLAM comprises:
   acquiring real-time image data in front of the vehicle or real-time image data of an inside of the compartment of the vehicle;
   extracting feature points of the real-time image data in front of the vehicle or the real-time image data of the inside of the compartment of the vehicle;
   matching the feature points of the real-time image data in front of the vehicle or the real-time image data of the inside of the compartment of the vehicle in different frames;
   estimating a motion parameter of the 3D map based on feature points successfully matched of the real-time image data in front of the vehicle or the real-time image data of the inside of the compartment of the vehicle in different frames and a normalization algorithm of the feature points;
   converting the feature points of the real-time image data in front of the vehicle or the real-time image data of the inside of the compartment of the vehicle in all frames to a same coordinate system in accordance with the motion parameter; and
   creating the 3D map or the compartment 3D model.

16. A device for visualization of vehicle's blind spot, comprising a creating circuit for creating a map, a determining circuit for determining a blind spot and an acquiring circuit for acquiring a target object in a blind spot, wherein
   the creating circuit is configured to acquire real-time image data in front of the vehicle, create a Three-Dimension (3D) map with the acquired image data and determine a current location of the vehicle in the 3D map;
   the determining circuit is configured to a blind spot in a vision of a driver; and
   the acquiring circuit is configured to determine environmental information of the blind spot in the vision in accordance with the 3D map, the current location of the vehicle in the 3D map and the blind spot in the vision of the driver,
   wherein the determining circuit is further configured to:
   acquire real-time image data of an inside of the compartment of the vehicle to create a compartment 3D model regarding the inside of the compartment of the vehicle;
   create a coordinate system;
   determine coordinate values of the driver and a sight-blocking object in the coordinate system based on the compartment 3D model;
   calculate relative location information between the driver and the sight-blocking object;
   acquire the relative location information between the driver and the sight-blocking object that blocks the vision of the driver; and
   determine the blind spot in the vision of the driver in connection with structure information of the sight-blocking object and the relative location information between the driver and the sight-blocking object that blocks the vision of the driver.

17. A terminal for visualization of vehicle's blind spot, comprising a processor and a memory, wherein the memory is configured to store computer program which realizes the method according to claim 1 when executed by the processor.

18. A system for visualization of vehicle's blind spot, comprising the terminal according to claim 17 and an image device which is configured to capture real-time image data and send the real-time data to the terminal.

19. A vehicle, comprising the system according to claim 18.

* * * * *